Patented Dec. 7, 1937

2,101,648

UNITED STATES PATENT OFFICE 2,101,648

PROCESS AND PRODUCT RELATING TO UNSATURATED XANTHATES

Herbert Peter Augustus Groll, Berkeley, Calif., assignor to Shell Development Company, San Francisco, Calif., a corporation of Delaware No Drawing. Application January 30, 1933,
Serial No. 654,253

11 Claims. (Cl. 260—99.11)

This invention relates to certain new unsaturated xanthates of aliphatic monohydric alcohols containing at least four carbon atoms to the molecule and to their manufacture.

I have found that unsaturated aliphatic monohydric alcohols can be reacted with carbon bisulfide and caustic soda or potash or ammonium hydroxide to yield novel products which are useful as vulcanizing accelerators, insecticides and in flotation processes as promoters, particularly in froth flotation operations.

A mixture of carbon bisulfide and unsaturated alcohol in varying proportions, since an excess of either may be employed, may be introduced into a suitable vessel provided with agitating means, and means for the removal of solid product, and preferably provided with a reflux condenser for preventing loss of carbon bisulfide or other volatile substances by volatilization due to the heat developed by the reaction. The desired amount of alkali solution may then be added and the mixture thoroughly agitated until reaction is complete, the length of time required varying with the proportions of the various ingredients used. By employing an excess of the carbon disulfide or unsaturated alcohol, the reaction temperature can be automatically controlled by the vaporization of said excess. The vaporized excess can then be condensed and recycled while stoichiometric amounts of the reactants are continuously being added to the reaction vessel.

If desired, the alkali metal hydroxide can be dissolved in a definite amount of water and this solution reacted with the amounts of alcohol and carbon bisulfide corresponding to the alkali metal hydroxide used. Part of the alkali metal hydroxide may be dissolved in the alcohol to form a saturated solution and the remainder dissolved in water. Alternatively, unsaturated alcohol and carbon bisulfide may be mixed first and the aqueous solution of alkali hydroxide then added or the hydroxide may be added to the reaction mixture in solid form and water added with agitation. Still another procedure consists in reacting the alcoholate with carbon disulfide.

Instead of employing an excess of one of the reactants having a comparatively low boiling temperature to control the temperature of the exothermic reaction, there can be used an inert fluid whose boiling temperature is advantageous to the process such as gasoline, benzol, carbon tetrachloride, paraffin hydrocarbons as propane, butane, pentane, their halogen derivatives and the like.

The xanthates formed may or may not contain water of crystallization, depending on the mode adopted for its preparation. However, if it is desired to obtain a dry salt, the water may be driven off by suitable treatment with heat or with a current of warm air passing through the material.

For illustrative purposes only reference will be had to the production of isobutenyl xanthate which is an unsaturated xanthate containing a tertiary carbon atom. The process is applicable with higher unsaturated alcohols such as the pentenyl, hexenyl, heptenyl, octenyl alcohols and the like whether of straight chain or forked chain character.

Example I

To 98 c. c. of a solution containing 0.21 mol. of KOH in isobutenol, 17.7 gms. carbon disulfide were added with cooling and stirring. The xanthate which precipitated from the solution was recovered by filtering. The product was washed with a small amount of isobutenol and dried at room temperature. The xanthate was of over 98% purity. It is a soft flaky powder of yellow color.

Example II

A thick paste was made of potassium hydroxide and an equivalent amount of isobutenol. The theoretical amount of carbon disulfide was added during a period of 1.5 hours while the mass was continuously stirred. The properties of the finished product agreed with that of Example I.

Example III 100 grams of potassium hydroxide were powdered and dissolved at 70° C. in 900 grams isooctenol which had been produced by hydrolysis of chlorinated di-isobutylene. After cooling the clear solution, 163 grams carbon disulphide were added with constant stirring and cooling. The precipitate was filtered, washed with ether several times, and dried under vacuum. About 385 grams of xanthate were recovered. The analysis of the product showed that it contained about 92% potassium iso-octenyl xanthate.

Since the xanthate dissolves in excess of the alcohol, it can be appropriately recovered by any suitable means such as by cooling or adding carbon disulfide and alkali metal hydroxide to the solution.

I claim as my invention:

1. A method of making unsaturated xanthates, which comprises providing a mixture of a monoolefinic aliphatic monohydric alcohol, containing at least four carbon atoms to the molecule, and possessing the general formula $$X-\overset{Y}{\underset{|}{C}}HOH$$

wherein X represents an isoalkenyl radical and Y represents a substituent of the class consisting of hydrogen and alkyl radicals, X being linked to the carbinol group by an unsaturated tertiary carbon atom, carbon disulfide, caustic alkali and water, and causing a reaction to take place to form an unsaturated xanthate.

2. A method of making unsaturated xanthates, which comprises providing a mixture of a mono-olefinic aliphatic monohydric alcohol containing at least four carbon atoms to the molecule, and possessing the general formula $$X-\overset{Y}{\underset{|}{C}}HOH$$

wherein X represents an iso-alkenyl radical and Y represents a substituent of the class consisting of hydrogen and alkyl radicals, X being linked to the carbinol group by an unsaturated tertiary carbon atom, carbon disulfide and caustic alkali and causing a reaction to take place to form an unsaturated xanthate, a thermally responsive fluid volatile under reaction conditions, being employed to control the heat of reaction.

3. A method of making unsaturated xanthates, which comprises providing a mixture of a mono-olefinic aliphatic monohydric alcohol containing at least four carbon atoms to the molecule, and possessing the general formula $$X-\overset{Y}{\underset{|}{C}}HOH$$

wherein X represents an isoalkenyl radical and Y represents a substituent of the class consisting of hydrogen and alkyl radicals, X being linked to the carbinol group by an unsaturated tertiary carbon atom, carbon disulfide and caustic alkali, and causing a reaction to take place to form an unsaturated xanthate, an excess of one of the reactants being employed to control the heat of reaction.

4. A method of making unsaturated xanthates, which comprises providing a mixture of a mono-olefinic aliphatic alcoholate, containing at least four carbon atoms to the molecule, and possessing the general formula $$X-\overset{Y}{\underset{|}{C}}HOM$$

wherein X represents an isoalkenyl radical, M represents an alkali metal, and Y represents a substituent of the class consisting of hydrogen and alkyl radicals, X being linked to the carbon atom by an unsaturated tertiary carbon atom, and carbon disulfide and causing a reaction to take place to form an unsaturated xanthate.

5. A mono-olefinic aliphatic xanthate containing at least five carbon atoms to the molecule, and possessing the general formula $$X-\overset{Y}{\underset{|}{C^1}}H-O-\underset{\underset{S}{\|}}{C}-SM$$

wherein X represents an isoalkenyl radical, M represents a metal, and Y represents a substituent of the class consisting of hydrogen and alkyl radicals, X being linked to the $C^1$ carbon atom by an unsaturated tertiary carbon atom.

6. A mono-olefinic iso-alkenyl xanthate which contains from five to nine carbon atoms to the molecule.

7. An alkenyl xanthate containing an unsaturated carbon atom linked by four bonds to three carbon atoms, one of the latter carbon atoms being linked to the oxygen atom of the xanthate radical.

8. A process for the production of unsaturated xanthates which comprises causing an unsaturated aliphatic monohydric alcohol which contains an unsaturated carbon atom linked to two carbon atoms and in addition linked by a single bond to a carbinol group to react with caustic alkali and carbon bisulphide.

9. Isobutenyl xanthate.
10. Alkali-metal isobutenyl xanthate.
11. Potassium isobutenyl xanthate.

HERBERT PETER AUGUSTUS GROLL.